(12) United States Patent
Tran et al.

(10) Patent No.: US 7,240,144 B2
(45) Date of Patent: Jul. 3, 2007

(54) ARBITRATION OF DATA TRANSFER REQUESTS

(75) Inventors: Tan Ba Tran, Round Rock, TX (US); Gerard Richard Williams, Sunset Valley, TX (US); David Terrence Matheny, Austin, TX (US); David Walter Flynn, Cambridge (GB)

(73) Assignee: Arm Limited, Cambridge (GB)

( * ) Notice: Subject to any disclaimer, the term of this patent is extended or adjusted under 35 U.S.C. 154(b) by 267 days.

(21) Appl. No.: 10/815,961

(22) Filed: Apr. 2, 2004

(65) Prior Publication Data

US 2005/0223129 A1   Oct. 6, 2005

(51) Int. Cl.
G06F 12/00 (2006.01)
(52) U.S. Cl. ............................. 711/5; 711/105; 712/215
(58) Field of Classification Search ................ 711/123, 711/5, 105, 154; 712/215
See application file for complete search history.

(56) References Cited

U.S. PATENT DOCUMENTS

| 4,979,100 | A  | * | 12/1990 | Makris et al. ............... 710/117 |
| 5,138,219 | A  | * | 8/1992  | Krisl et al. .................. 313/112 |
| 6,584,528 | B1 |   | 6/2003  | Kurafuji et al. |
| 6,681,283 | B1 | * | 1/2004  | Thekkath et al. ........... 710/305 |
| 6,931,479 | B2 | * | 8/2005  | Choi ............................. 711/5 |
| 2003/0033573 | A1 | * | 2/2003 | Tamura et al. .............. 714/763 |

FOREIGN PATENT DOCUMENTS

WO   WO 96/10904   4/1996

OTHER PUBLICATIONS

IBM Technical Discl. Bulletin vol. 28 No. 12 May 1986, pp. 5329-5333, "High-Speed Processor Bus Arbitration".*
C. K. Tang, "Cache System Design in the Tightly Coupled Multi-processor System," Proceedings of the National Computer Conference, New York, Jun. 7-10, 1976, vol. 45, pp. 749-753.*

* cited by examiner

Primary Examiner—Pierre-Michel Bataille
(74) Attorney, Agent, or Firm—Nixon & Vanderhye P.C.

(57) ABSTRACT

A data processor core 10 comprising: a memory access interface portion 30 operable to perform data transfer operations between an external data source and at least one memory 120 associated with said data processor core; a data processing portion 12 operable to perform data processing operations; a read/write port 40 operable to transfer data from said processor core to at least two buses 75A, 75B said at least two buses being operable to provide data communication between said processor core 10 and said at least one memory 120, said at least one memory 120 comprising at least two portions 120A, 120B, each of said at least two buses 75A, 75B being operable to provide data access to respective ones of said at least two portions 120A, 120B; arbitration logic 110 associated with said read/write port 40; wherein said arbitration logic is operable to route a data access request requesting access of data in one portion of said at least one memory received from said memory access interface to one of said at least two buses providing access to said one portion of said at least one memory and to route a further data access request requesting access of data in a further portion of said at least one memory received from said data processing portion to a further one of said at least two buses providing access to said further portion of said at least one memory, said routing of said data access requests being performed during the same clock cycle.

13 Claims, 4 Drawing Sheets

ARBITRATION OF DATA TRANSFER REQUESTS

BACKGROUND OF THE INVENTION

1. Field of the Invention

This invention relates to the field of data processing systems. More particularly, this invention relates to the field of data transfer requests.

2. Description of the Prior Art

In data processing systems it is often necessary to transfer data from one memory to another, or between an external data source and a memory associated with the data processor. For example, in boot up codes may be stored in a slow memory such as a Flash and prior to them being used, it may be desirable to transfer them to a faster instruction memory associated with the processor. Generally, such transfers occurs via the data processor core, with a load instruction specifying a location in the Flash memory from which the data is to be read and a register in the core to which the data item is to be written, and a store instruction specifying the register in the core and the destination location in the faster instruction memory. Such a transfer is fairly slow and is expensive in instructions, taking several instructions for each data item.

The problem of data transfers being relatively slow and expensive in instructions can be particularly acute in applications such as data logging, where large amounts of data may need to be transferred to memory via a processor, at any time.

SUMMARY OF THE INVENTION

Viewed from one aspect the present invention provides a data processor core comprising: a memory access interface portion operable to perform data transfer operations between an external data source and at least one memory associated with said data processor core; a data processing portion operable to perform data processing operations; a read/write port operable to transfer data from said processor core to at least two buses, said at least two buses being operable to provide data communication between said processor core and said at least one memory, said at least one memory comprising at least two portions, each of said at least two buses being operable to provide data access to respective ones of said at least two portions; arbitration logic associated with said read/write port; wherein said arbitration logic is operable to route a data access request requesting access of data in one portion of said at least one memory received from said memory access interface to one of said at least two buses providing access to said one portion of said at least one memory and to route a further data access request requesting access of data in a further portion of said at least one memory received from said data processing portion to a further one of said at least two buses providing access to said further portion of said at least one memory, said routing of said data access requests being performed during the same clock cycle.

The present invention recognises that in some circumstances it is particularly important that data can be transferred quickly to or from a particular memory. It addresses this problem by providing a memory access interface. The division of the core into portions has several advantages, one is that data may be transferred faster than would be the case if the data was transferred via a standard processor core as the instructions required to read the data, store it in a register on the core and then write it to a memory are not required.

However, a problem associated with providing a memory access interface portion of the core along side the processing portion is that both portions may wish to access data stored in an associated memory at the same time. This problem can be particularly acute in applications such as data logging, where a large amount of data that does not need to be processed immediately is transferred via the core to a memory.

This problem is addressed by providing at least two buses operable to provide data communication between the processor core and the associated memory, the associated memory being divided into at least two portions, a bus providing data access to respective portions. Arbitration logic is provided in association with the bus and the read/write port and is operable to route data access requests requesting access to data in a particular portion of the memory to the appropriate bus. The provision of more than one bus allows data access requests to different portions of the memory that are received from the memory access interface and the data processing portion of the core in the same clock cycle to be processed in parallel along respective buses. This alleviates some of the problems that can occur when two portions of the core are trying to access one memory via a single bus.

In preferred embodiments, the arbitration logic is operable to select one of said at least two buses to route said data access request to, in dependence upon an address location within said at least one memory associated with said data access request.

The address associated with the data provides an indication of the portion of the memory where it is stored and is thus a useful indicator that can be used by the arbitration logic to determine which bus to use.

In preferred embodiments, said at least two portions of said memory comprise an instruction portion operable to store instructions and at least one data portion operable to store data items said arbitration logic being operable to route said access requests to a first one of said at least two buses providing access to said instruction portion when data to be transferred is an instruction and to route said data access requests to a second one of said at least two buses providing access to said at least one data portion when data to be transferred is a data item.

The division of the memory into an instruction portion and a data portion is a practical way of dividing the memory.

Preferably, said at least one data portion comprises two data portions an even data portion operable to store data having an even address and an odd data portion operable to store data having an odd address, said read/write port being operable to transfer data between said processor core and said at least one memory via three buses, a first bus providing access to said instruction portion, a second bus providing access to said odd data portion and a third bus providing access to said even data portion, and said arbitration logic being operable to route a data access request to said first bus when data to be transferred in an instruction, to said second bus when data to be transferred is a data item associated with an odd address and to said third bus when data to be transferred is a data item associated with an even address.

By dividing the data portions into odd and even address portions, a data access request that accesses a large number of concurrently stored data items will use alternate data buses. This means that it is highly unlikely that one of the portions of the processor core will monopolise one of the data buses for a long period and thereby prevent access to the corresponding portion of the memory by the other portion of the processor core.

In preferred embodiments, said arbitration logic is operable in response to said receipt of a data access request from said memory access interface portion and a data access request from said data processing portion, both data access requests requesting access to data in one portion of said at least one memory to route said data access request from said memory access interface portion to one of said at least two buses providing data access to said one portion of said at least one memory before routing said request from said processing portion to said one said at least two buses.

The arbitration logic is operable to give priority to the memory access interface when data access requests from both portions are received during the same processor clock cycle. This is because the memory access interface is provided on the processor core in order to give fast access to memory and thus it makes sense to give it priority. The provision of a plurality of buses helps prevent the processing portion of the core being denied access to a memory over a long period of time which could seriously affect operation of the core particularly if important code is being executed by the processing portion of the core.

Advantageously, said arbitration logic is operable to detect a wait request from at least one busy portion of said at least one memory, said arbitration logic being operable not to route any data access requests to said busy portion until said wait request is no longer detected.

In some embodiments the memory may not operate as fast as the processor clock. In such cases, it is highly convenient that a wait signal can be used which the arbitration logic understands. This prevents data access requests being sent to or from the memory faster than it can cope with them.

A second aspect of the present invention provides a data processing apparatus comprising a data processing core according to a first aspect of the present invention; and at least one memory, said at least one memory being divided into at least two portions; and at least two buses, each bus allowing data access to a respective portion of said at least two portions of said at least one memory.

Advantageously, said at least one memory is a tightly controlled memory.

Although different sorts of memories can be used by embodiments of the invention, it is particularly well adapted to deal with tightly controlled memories.

A third aspect of the present invention provides a method of transferring data between an external data source and at least one memory associated with a data processor core, said data processor core comprising a memory access interface portion operable to perform data transfer operations between said external data source and said at least one memory associated with said data processor core and a data processing portion operable to perform data processing operations, said method comprising the steps of: in response to a data access request requesting access of data in one portion of said at least one memory received from said memory access interface portion and a data access request requesting access to data in a further portion of said at least one memory received from said data processing portion, routing said data access request received from said memory access interface portion to one of at least two buses, said one of said at least two buses providing access to said one portion of said at least one memory, and routing said data access request received from said data processing portion to a further of said at least two buses, said further bus providing access to said further portion of said at least one memory, said routing of said data access requests being performed during the same clock cycle.

A fourth aspect of the present invention provides arbitration logic operable to control a data processor to perform the steps of the method according to a third aspect of the invention.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
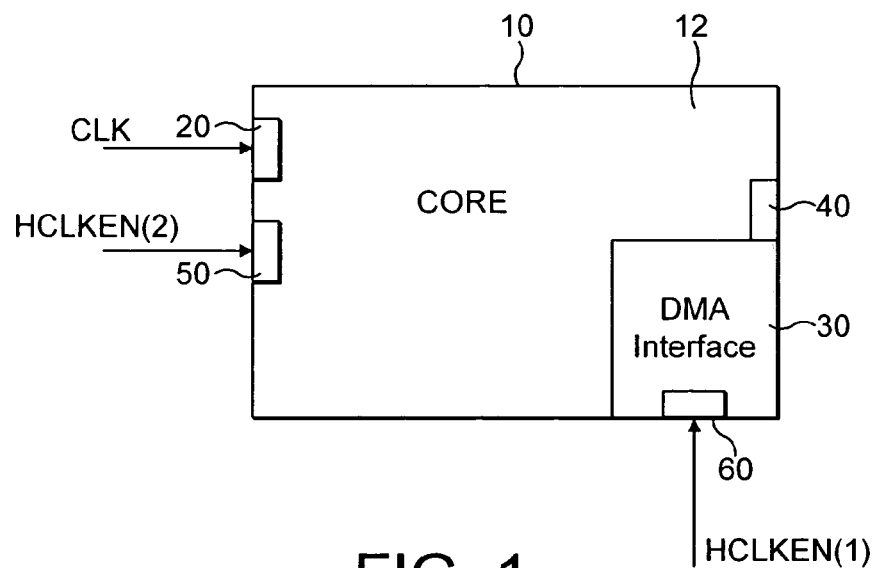
FIG. 1 schematically illustrates a processor core according to an embodiment.

FIG. 1 shows a processor core 10 which is divided into portions, one portion 12 being a standard data processing portion, and the other portion being a direct memory interface (DMA) 30. The processor core 10 has a clock signal input 20 for receiving a processor clocking signal CLK, and at least one read/write port 40 operable to be connected via a bus to memory associated with the core. The core may also have two further inputs a memory access enable signal input 60 for receiving a clock enable signal HCLKEN(1) and a processor enable input 50 for receiving a clock enable signal HCLKEN(2). In some embodiments the processor enable signal HCLKEN(2) is not received as an external signal, but is generated by processing logic within the core (see FIG. 3). The processing portion 12 of the core is clocked by the processor clock signal CLK when the HCLKEN(2) signal has a predetermined value in this embodiment when it is 1. When the HCLKEN(2) signal is 0 the processing portion does not receive the processor clock signal CLK and it is thus, not active.

The direct memory interface portion 30 of the core is also clocked by the processor clock signal CLK. It only receives this CLK signal when the memory access enable signal HCLKEN(1) has a predetermined value in this embodiment 1. When it is zero the memory access interface 30 does not receive the processor clock signal CLK and it is then inactive.

Figure 2:
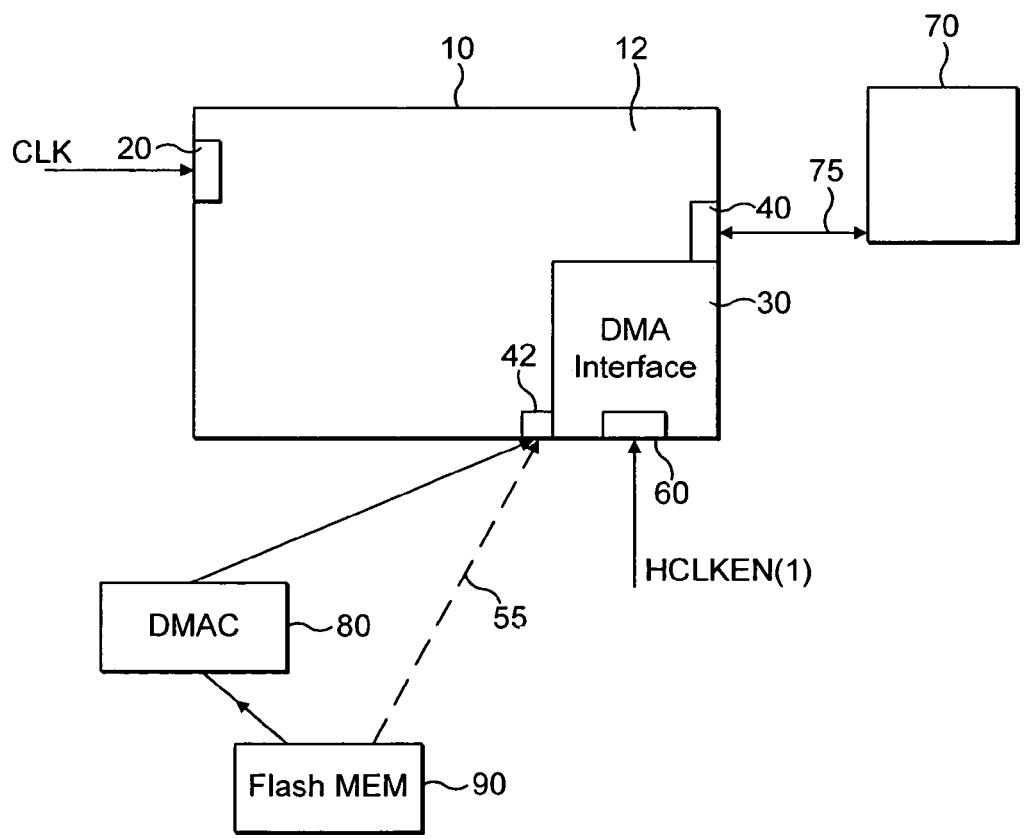
FIG. 2 schematically shows a data processing apparatus according to an embodiment.

FIG. 2 shows a data processing apparatus according to an embodiment of the present invention, having a data processor core 10 as shown in FIG. 1, an instruction memory 70, a direct memory access controller (DMAC) 80, and a flash memory 90. The processor core is connected to the instruction memory 70 by a data bus 75. The instruction memory 70 is a tightly coupled memory and as such data transfers between the memory and the core always take a certain predictable time.

The DMAC 80 controls the transfer of data between an external data source, in this case the flash memory 90, and a memory associated with the core, in this case the instruction memory 70 via the DMA interface 30. In this embodiment the external data source is a flash memory associated with the processor, but embodiments of the invention can transfer data between any other external data source and a memory associated with the processor. In the embodiment shown data is transferred between Flash memory 90 and instruction memory 70 via a DMA interface 30. This can be done while the processing portion 12 is active or while it is sleeping, i.e. HCLKEN(2) is 1 or 0. The DMAC adds control signals to the data being transferred, the control signals indicating the address where the data is (to be) stored in memory 70 and a signal indicating whether the data transfer is a read or write.

In some embodiments where the flash memory or other external data source is connected to the processor core via an AMBA bus, the data can be sent directly via the AMBA bus 55 to the DMA interface and the DMAC 80 is not required. This is possible as the bus has a protocol which is understood by the DMA interface, and thus, the required address and control signals are already associated with the data being transferred and the addition of these signals by a DMAC is not required.

The DMA interface 30 is clocked by the processor clock signal CLK and at each clock cycle a data item and its corresponding address are input to the DMA interface. They are then stored in a register and in a subsequent clock cycle output via read/write port 40 along data bus 75 to instruction memory 70.

One example of operation of the data processing apparatus of FIG. 2 is on boot up. In this embodiment, the boot up code of a data processor is stored in the flash memory 90. Flash memory is reasonably slow memory, thus prior to executing this code it is transferred to a faster instruction memory 70. Before boot up occurs the processor core is inactive, following receipt of a boot up request, the DMAC 80 reads the boot up code from the flash memory 90 and passes the data to the DMA interface via the input 42. At this point the memory access enable signal HCKLEN(1) is set to one and thus, the DMA interface reads data items passed from the DMAC, the DMA interface being clocked by the processor clock. This data passes through the DMA interface 30 and is then output via the read/write port 40 and the data bus 75 of the processor core to instruction memory 70. In this embodiment the core is sleeping (clocking to the data processing portion of the core is turned off and it is in wait-for-interrupt mode) and thus, the DMA interface 30 can use the data bus connecting the core with the memory, without any potential conflict with data transfers from the core itself.

Figure 3:
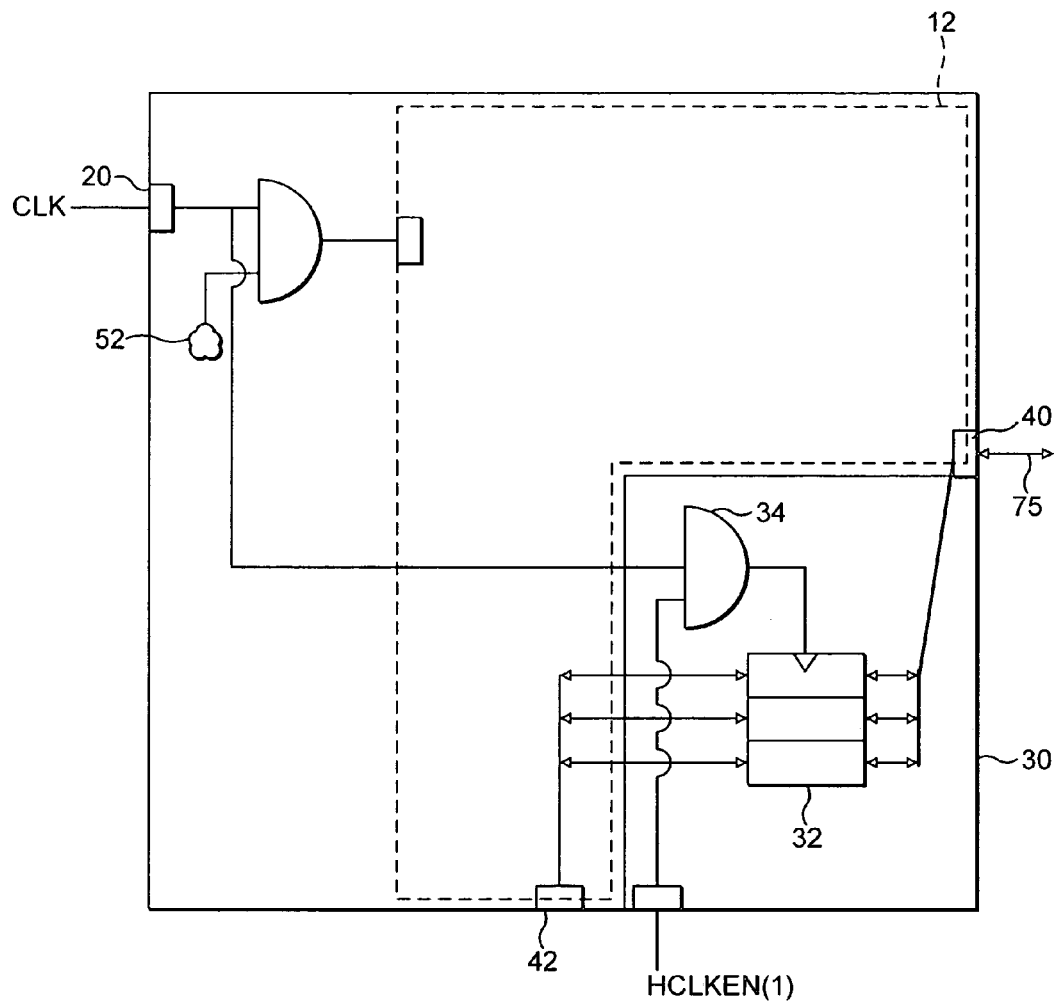
FIG. 3 schematically shows a processor core in more detail.

FIG. 3 shows a processor core similar to the one shown in FIG. 1, in this embodiment the processor enable signal is not input to the core as an external signal but is generated by processing logic 52. This processing logic generates the processing enable signal in response to monitoring the state of the system controller of the core. The processing enable signal and the processor clock signal are passed through an AND gate and the output of the AND gate is used to clock the processing portion 12 of the processor core. Thus, when the processing enable signal is one the processor clock signal CLK is received by the processing portion 12 and when it is zero no clock signal is received and thus the processing portion of the core is inactive or sleeping. In the sleeping mode the core samples for interrupt or debug requests on external pins, and once it receives one of these a processor enable signal gets generated by processing logic 52 indicating to the processor core that it should exit the Wait-for-Interrupt mode (i.e. sleep mode).

FIG. 3 also shows the direct memory access interface portion 30 of the core 10 of FIG. 1 in greater detail. The DMA interface 30 comprises several registers 32 each operable to hold data transferred from an external data source and input to the core via input 42 or data transferred from a memory and input via bus 75 to read/write port 40. This data is held in the registers 32 and is then transferred either to the external data source or to the memory. The direct memory access interface 30 also comprises an AND gate 34 operable to AND the processor clock with the memory interface enable signal HCLKEN(1). The process of data transfer including the storage in the registers is clocked via a signal output from AND gate 34. AND gate 34 receives the processor clock signal CLK as one input and a memory access interface enable signal HCLKEN(1) as the other input. Thus, when the memory access interface enable signal is enabled, i.e. is one, the processor clock is present at the output of the AND gate 34 and thus the direct memory access interface is clocked and is active and the registers 32 can receive and transfer data. When HCLKEN(1) is 0 no clock signal is received and the memory access interface 30 is inactive. The data transferred includes data items, an address associated with the data items and a control signal which represents whether the data is to be read from the address or written to it. They are generally transferred in parallel to the registers 32 according to the AMBA protocol.

Figure 4:
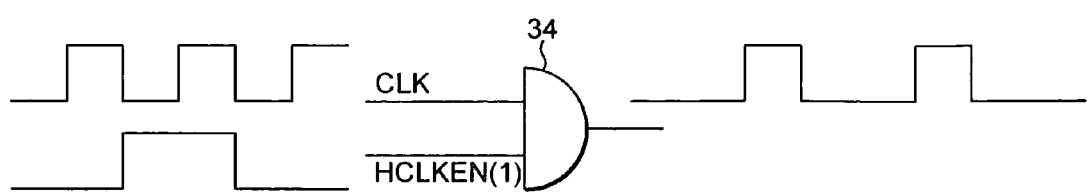
FIG. 4 shows an example of logic operable to combine a clock and clock enable signal.

FIG. 4 shows AND gate 34 of the direct memory access interface receiving two clocking signals. As can be seen, in this example the clock enable signal is not a steady signal but is rather a clock signal itself. This results in AND gate 34 producing a clock signal of different frequency to the processor clock at its output. It is this signal which clocks the data transfers performed by the memory access interface 30. This can be advantageous when data is being transferred from a slow memory that cannot operate at the clocking speed of the processor clock. The ability to provide a slower clock in this way is an efficient and simple way to alleviate potential problems associated with slow memory allowing as it does data transfer to occur at a rate that is suitable for the slower memory.

Figure 5:
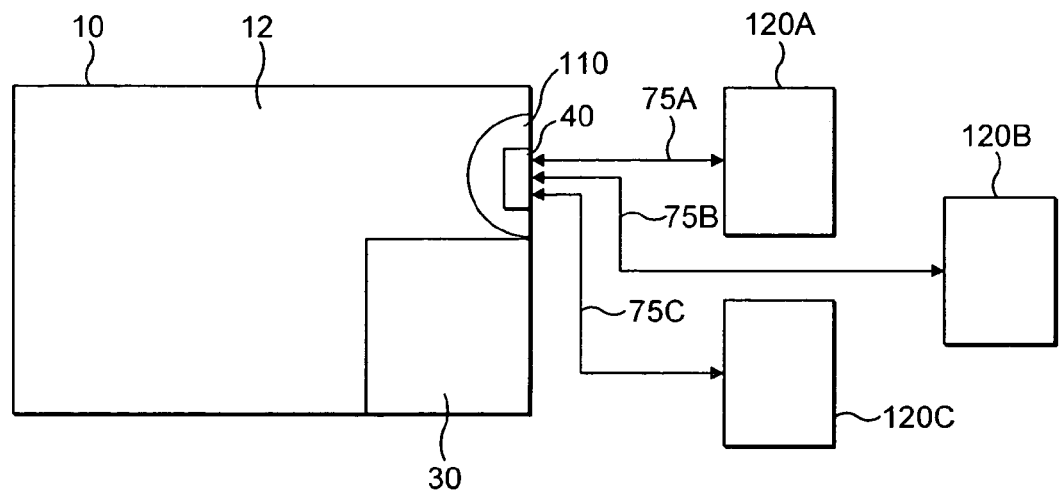
FIG. 5 schematically shows a processor core, memory and buses linking the two according to an embodiment.

One potential problem of having a memory access interface 30 that can be active at the same time as a further processing portion of a data processing core is that they might both request data accesses via read/write port 40 at the same time. FIG. 5 shows a way of dealing with this. In this embodiment arbitration logic 110 is provided associated with the read/write port 40, the arbitration logic controlling which data access request is handled first when two data access requests are received in the same clock cycle. As the direct memory interface 30 is provided in order to give fast data transfer, the arbitration logic 110 is set up to always give DMA data access requests priority over requests received from the processing portion 12. One potential problem with this is that if a large data transfer request is received from an external data source, the bus 75 could be monopolised for some time by the DMA interface 30 and thus, the processing portion 12 which may need to execute important code that needs access to a memory along bus 75, would suffer starvation. This problem has been addressed in embodiments by making the read/write port 40 able to attach to a plurality of data buses. FIG. 5 shows read/write port 40 connected to 3 buses 75A, 75B and 75C.

In this embodiment tightly coupled memory 120 (see FIG. 6) is divided into three portions. Portion 120a is operable to store data having an even address, portion 120b is operable to store data having an odd address and portion 120c is operable to store instructions. Data bus 75a connects read/write port 40 to the even data portion of the memory 120a, bus 75b connects read/write port to the odd data portion for memory 120b and bus 75c connects the read/write port to the instruction portion of the memory 120c. In this way there are three possible routes to tightly coupled memory 120 and they can be used in parallel during the same clock cycle. This alleviates the problem of data starvation that might occur to the processing portion 12 of the data processor core 10 when priority is given in all cases to data access requests from the direct memory access interface 30.

Arbitration logic 110 controls which requests are given priority it also controls the routing of data access requests to an appropriate bus. It does this by monitoring the address associated with the data and then puts it on the bus which is operable to access the portion of the memory 120 containing this address. It should be noted that although instruction portion of the memory 120c is generally used to store instructions, it is possible for data items to be placed alongside the instructions in cases where an instruction has data associated with it. The routing of the data is done using the address associated with the data rather than by detection of the sort or data that is being transferred.

In addition to controlling routing of the signals, and giving priority to data access requests from the DMA interface 30, arbitration logic 110 can also be used to detect wait signals output from portions of the memory when the memory is too slow to keep up with the data access requests coming out of the core and clocked by the processor clock CLK. In this case the arbitration logic 110 does not process any further data access requests until the wait signal is no longer detected.

Figure 6:
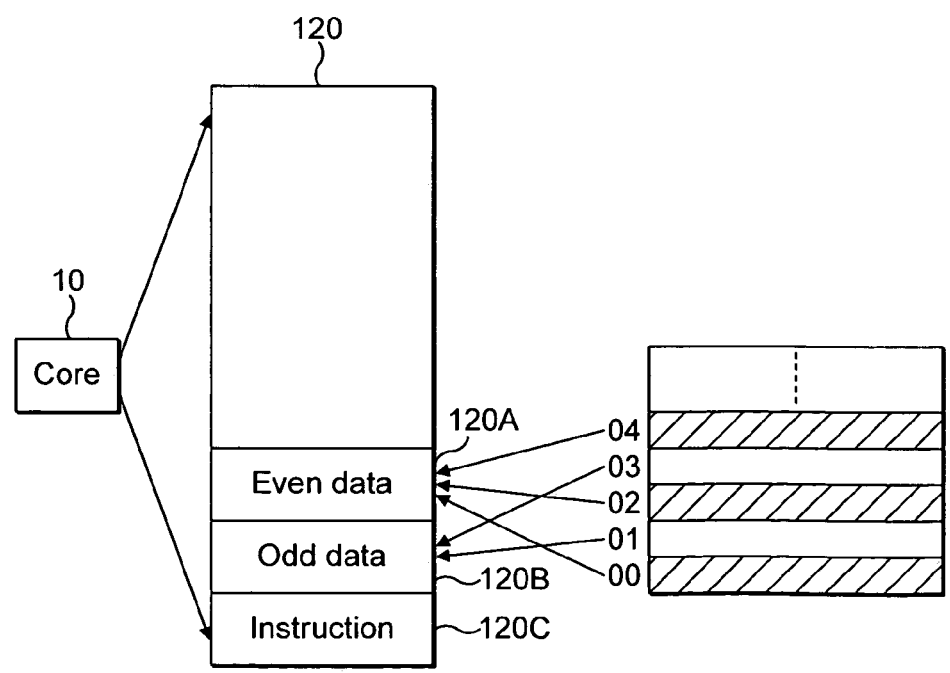
FIG. 6 shows an associated memory according to an embodiment.

FIG. 6 shows in more detail the tightly coupled memory 120 which is associated with processor core 10. As can be seen the memory is divided into portions, the even addresses being mapped to portion 120a and the odd addresses being mapped to portion 120b. In this example the memory is interleaved on a word boundary. Instructions are stored in portion 120c. The mapping of data using even and odd addresses in this way means that several data items that have adjacent addresses are accessed in series using alternate buses 120a and 120b. This means that the chances of one of the buses to a particular portion of memory being monopolised by a large number of serial data access requests is low, and thus starvation of data to the processing portion of the core is unlikely to occur.

Figure 7:
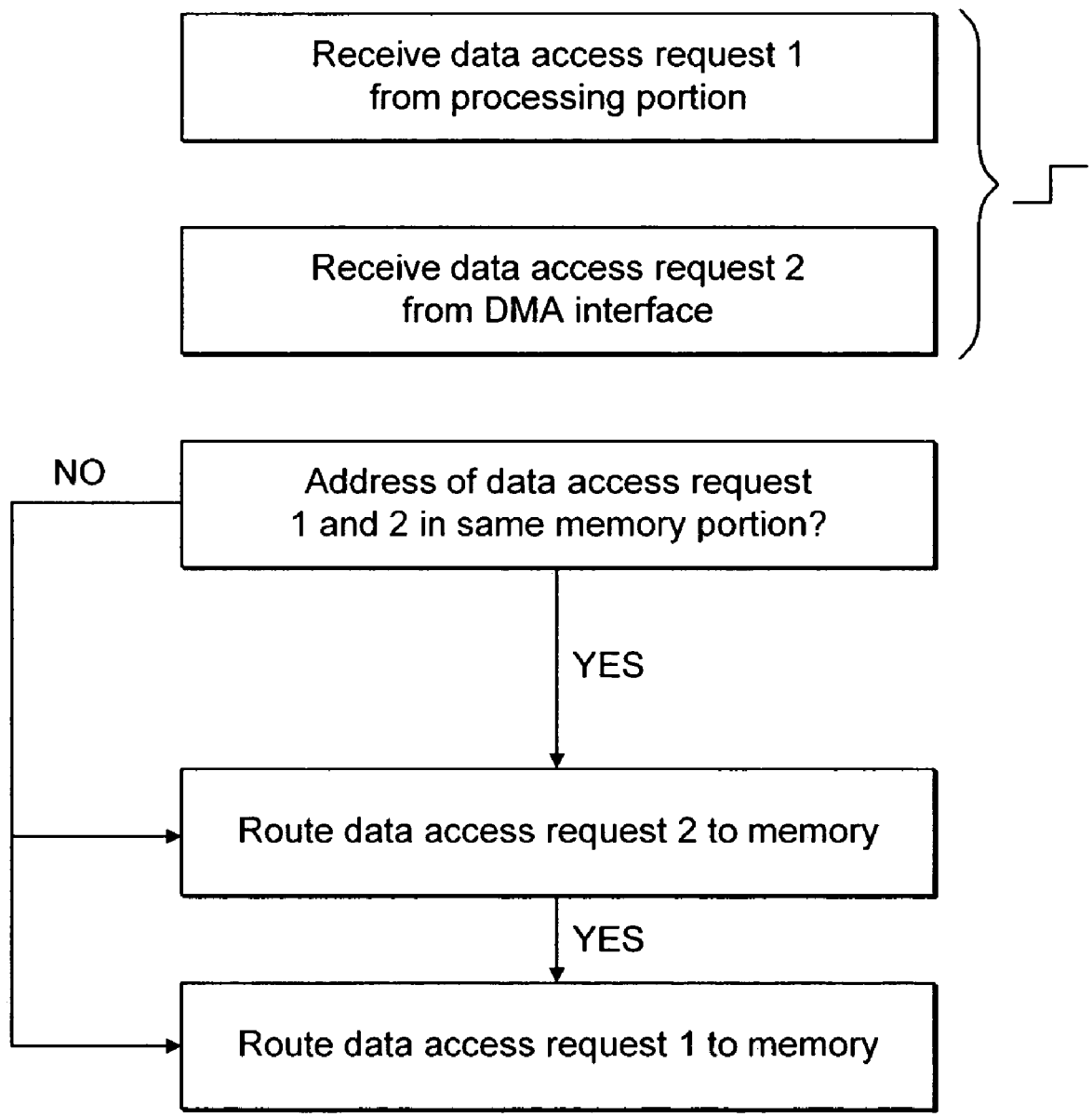
FIG. 7 shows a flow diagram illustrating the steps involved in routing data access requests.

FIG. 7 shows a flow diagram schematically showing how arbitration logic 110 deals with data access requests from the processing portion 12 and DMA interface received in the same clock cycle. As can be seen the arbitration logic checks to see if they are accessing an address in the same portion of memory and if they are not they are routed along respective buses in parallel. If they comprise addresses in the same memory portion then data access request 2 from the DMA interface is routed first and in the next clock cycle data access request 1 from the processing portion is routed.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims. For example, various combinations of the features of the following dependent claims could be made with the features of the independent claims without departing from the scope of the present invention.

We claim:

1. A data processing apparatus comprising:
   arbitration logic; and
   a data processor core, said data processor core comprising:
   a memory access interface portion for performing data transfer operations between an external data source and at least one memory associated with said data processor core;
   a data processing portion for performing data processing operations;
   a read/write port for transferring data from said processor core to first and second buses, said first and second buses providing data communication between said processor core and said at least one memory, said at least one memory comprising first and second memory portions, said first bus providing exclusive access to said first memory portion and said second bus providing exclusive access to said second memory portion, wherein said arbitration logic is associated with said read/write port and said arbitration logic is configured to route a data access request requesting access of data in said first memory portion received from said memory access interface to said first bus and to route a further data access request requesting access of data in said second memory portion received from said data processing portion to said second bus, said routing of said data access requests being performable during the same clock cycle,
   wherein said first and second portions of said memory include an instruction portion for storing instructions and at least one data portion for storing data items, respectively, said arbitration logic configured to route said data access request to said first bus for providing access to said instruction portion when data to be transferred is an instruction and to route said data access request to said second bus for providing access to said at least one data portion when data to be transferred is a data item, and
   wherein said at least one data portion includes an even data portion for storing data having an even address and an odd data portion for storing data having an odd address, said read/write port configured to transfer data between said processor core and said at least one memory via three buses including said first bus for providing access to said instruction portion, said second bus for providing access to said odd data portion, and a third bus for providing access to said even data portion, and said arbitration logic is configured to route a data access request to said first bus when data to be transferred is an instruction, to said second bus when data to be transferred is a data item associated with an odd address, and to said third bus when data to be transferred is a data item associated with an even address.

2. A data processing apparatus according to claim 1, said arbitration logic selecting one of said first and second buses to which said data access request is routed in dependence upon an address location within said at least one memory associated with said data access request.

3. A data processing apparatus according to claim 1, wherein said arbitration logic, in response to receipt of a data access request from said memory access interface portion and a data access request from said data processing portion, both data access requests requesting access to data in one portion of said at least one memory, routing said data access request from said memory access interface portion to one of said first and second buses providing data access to said one portion of said at least one memory before routing said request from said processing portion to said one of said first and second buses.

4. A data processing apparatus according to claim 1, said arbitration logic detecting a wait request from at least one busy portion of said at least one memory, said arbitration logic not routing any data access requests to said busy portion until said wait request is no longer detected.

5. A data processing apparatus according to claim 1, wherein said data processor core comprises said arbitration logic.

6. A data processing apparatus comprising:
arbitration logic; and
a data processor core, said data processor core comprising:
a memory access interface portion for performing data transfer operations between an external data source and at least one memory associated with said data processor core;
a data processing portion for performing data processing operations;
a read/write port for transferring data from said processor core to first and second buses for providing data communication between said processor core and said at least one memory, said at least one memory including first and second memory portions, said first bus providing exclusive access to said first memory portion and said second bus providing exclusive access to said second memory portion. wherein said arbitration logic is associated with said read/write port and said arbitration logic is configured to route a data access request requesting access of data in said first memory portion received from said memory access interface to said first bus and to route a further data access request requesting access of data in said second memory portion received from said data processing portion to said second bus, said routing of said data access requests being performable during the same clock cycle, and
wherein said at least one memory is divided into three portions, an instruction portion for storing instructions, an even data portion for storing data having an even address, and an odd data portion for storing data having an odd address, said data processing apparatus comprising three buses, said read/write port configured to transfer data between said processor core and said at least one memory via said three buses, said first bus for providing access to said instruction portion, said second bus for providing access to said odd data portion, and a third bus for providing access to said even data portion.

7. A data processing apparatus according to claim 6, wherein said at least one memory is a tightly coupled memory.

8. A method of transferring data between an external data source and at least one memory associated with a data processor core, said data processor core comprising a memory access interface portion performing data transfer operations between said external data source and said at least one memory associated with said data processor core and a data processing portion performing data processing operations, said method comprising the steps of:
in response to a data access request requesting access of data in a first memory portion of said at least one memory received from said memory access interface portion and a data access request requesting access to data in a second memory portion of said at least one memory received from said data processing portion, routing said data access request received from said memory access interface portion to one of first and second buses, said first bus providing exclusive access to said first memory portion, and routing said data access request received from said data processing portion to a second bus, said second bus providing exclusive access to said second memory portion, said routing of said data access requests being performed during the same clock cycle,
wherein said first and second portions of said memory include an instruction portion storing instructions and at least one data portion storing data items, said routing said data access requests includes routing a data access request to said first bus providing exclusive access to said instruction portion when data to be transferred is an instruction and routing said data access request to said second bus providing exclusive access to said at least one data portion when data to be transferred is a data item, and
wherein said at least one data portion includes two data portions, an even data portion storing data having an even address and an odd data portion storing data having an odd address, said routing step including routing data accesses to one of three buses, said first bus providing access to said instruction portion, said second bus providing access to said odd data portion, and a third bus providing access to said even data portion, and said routing including routing a data access request to said first bus when data to be transferred is an instruction, to said second bus when data to be transferred is a data item associated with an odd address, and to said third bus when data to be transferred is a data item associated with an even address.

9. A method according to claim 8, wherein said step of routing data access requests to respective data buses is done in dependence upon an address location within said at least one memory associated with said data access request.

10. A method according to claim 8, wherein said routing step in response to receipt of a data access request from said memory access interface portion and a data access request from said data processing portion, both data access requests requesting access to data in a portion of said at least one memory accessed by one of first and second buses, routes said data access request from said memory access interface portion to said one of said first and second buses before routing said request from said processing portion to said one of said first and second buses.

11. A method according to claim 8, said routing step detecting a wait request from at least one busy portion of said at least one memory, and in response to detection of said wait request not routing any data access requests to said busy portion until said wait request is no longer detected.

12. Arbitration logic controlling a data processor to perform the steps of the method according to claim 8.

13. A method of transferring data between an external data source and at least one memory associated with a data processor core, said data processor core comprising a memory access interface portion performing data transfer operations between said external data source and said at least one memory associated with said data processor core and a data processing portion performing data processing operations, said method comprising:

in response to a data access request requesting access of data in a first memory portion of said at least one memory received from said memory access interface portion and a data access request requesting access to data in a second memory portion of said at least one memory received from said data processing portion, routing said data access request received from said memory access interface portion to one of first and second buses, said first bus providing exclusive access to said first memory portion, and routing said data access request received from said data processing portion to a second bus, said second bus providing exclusive access to said second memory portion, said routing of said data access requests being performed during the same clock cycle, wherein said at least one memory is divided into three portions, an instruction portion storing instructions, and two data portions, an even data portion storing data having an even address and an odd data portion storing data having an odd address, said routing step routing a received data access request to one of three buses, said first bus providing access to said instruction portion, said second bus providing access to said odd data portion, and a third bus providing access to said even data portion, in dependence upon an address of said data associated with said data access request.

* * * * *